(12) United States Patent
Sandiford

(10) Patent No.: US 8,481,888 B2
(45) Date of Patent: Jul. 9, 2013

(54) AIRCRAFT HEATING ARRANGEMENT

(75) Inventor: Arthur David Sandiford, Lake Hughes, CA (US)

(73) Assignee: Electrofilm Manufacturing Company LLC, Valencia, CA (US)

( * ) Notice: Subject to any disclaimer, the term of this patent is extended or adjusted under 35 U.S.C. 154(b) by 480 days.

(21) Appl. No.: 12/777,699

(22) Filed: May 11, 2010

(65) Prior Publication Data

US 2011/0259865 A1    Oct. 27, 2011

Related U.S. Application Data

(60) Provisional application No. 61/328,351, filed on Apr. 27, 2010.

(51) Int. Cl.
*B60L 1/02*    (2006.01)

(52) U.S. Cl.
USPC .......................... 219/202; 392/465

(58) Field of Classification Search
USPC .......................... 219/202; 392/465
See application file for complete search history.

(56) References Cited

U.S. PATENT DOCUMENTS

2008/0223841 A1*    9/2008    Lofy ............................. 219/202

* cited by examiner

*Primary Examiner* — Julio J Maldonado
*Assistant Examiner* — Robert Bachner
(74) *Attorney, Agent, or Firm* — Dinsmore & Shohl LLP

(57) ABSTRACT

A heater for heating air passing through a conduit to an aircraft cabin includes a first support ring in the conduit, defining an air passage there through. A plurality of serpentine heating elements is provided, with each heating element extending across the air passage and being supported at both sides of the air passage by the support ring. The serpentine heating elements are generally parallel to each other and evenly spaced in the air passage. A power supply supplies electrical current to the heating elements such that air passing through the air passage is heated by the heating elements. The heating elements may are non-planar, wavy, corrugated in shape, permitting them to be supported only at their side edges.

28 Claims, 4 Drawing Sheets

AIRCRAFT HEATING ARRANGEMENT

CROSS-REFERENCE TO RELATED APPLICATION

This application claims the benefit of U.S. Provisional Application Ser. No. 61/328,351, filed on Apr. 27, 2010, for APPARATUS FOR IMPROVING SUPPLEMENTAL AIRCRAFT ELECTRICAL HEATING.

STATEMENT REGARDING FEDERALLY SPONSORED RESEARCH OR DEVELOPMENT

Not applicable.

BACKGROUND OF THE INVENTION

Aircraft are typically equipped with electrical air heaters that heat air supplied through an air duct to one or more exit registers in the cabin interior. The air to be heated may be drawn from outside of the aircraft, recirculated cabin air, or a mixture of outside air and cabin air, and the heater may typically raise the temperature of the air by approximately 45° F. The flow of air through the heater can be produced by either a remote, electrically powered fan, or by a fan positioned immediately adjacent the heater. Such a heater typically has heating elements that are enclosed within a protective, electrically non-conductive shell to prevent accidental contact with the heating elements. With electrical air heaters of this type, the pressure drop experience by the air passing through the heater affects the size, number, and capacity of the fans required to circulate the air at a desired rate. It is therefore desirable to minimize this pressure drop. Further, it is desirable to heat the air passing through the heater evenly to eliminate the need for additional air mixing devices. Such devices complicate the air heating system, and produce an additional drop in the pressure of the air, requiring even larger and more powerful fans. An aircraft air heater must also be able to withstand sudden changes in the flow rate of the air without damage, and without adversely affecting the temperature of the air leaving the heater. All aircraft devices, including air heaters, must past a battery of certification tests, demonstrating the ability to withstand exposure to severe vibration, pressure variations, temperature variations, and other tests, as well. A further, significant design goal of any aircraft component, including air heaters, is that the component be as light as possible.

Aircraft air heaters have, in the past, incorporated a number of thin, flat electrical heating elements, producing heating with reduced heat stratification. Typically, thin, light heating elements, each consisting of a resistance heating layer, surrounded by layers of fiber reinforced composite, have been used to provide good heat transfer. However, unless the flat heating elements are reinforced with additional materials, or supported with secondary internal structures that adversely reduce the airflow area, these flat components have been found to be too weak to withstand the vibration to which aircraft heaters are subjected in normal operation. Incorporating support structures into the interior of such a heater, however, has resulted in restricting the flow of air through the heater, causing a greater pressure drop and more uneven heating. An additional drawback of using thin, flat heating elements is that they may produce an air flow pattern that switches sporadically between laminar and turbulent flow under minor variations in air flow rate. This change between laminar and turbulent flow reduces heater efficiency, and can also cause damage to the heater due to overheating of portions of the heater elements.

Finally, it is desirable that an air heating assembly be electrically isolated, with no conductive electrical path outside of the heating elements themselves. This simplifies heater installation in all-composite aircraft, and saves additional weight by eliminating all grounding straps.

SUMMARY

A heater for heating air passing through a conduit to an aircraft cabin includes a first support ring in the conduit, defining an air passage there through. A plurality of serpentine heating elements is provided, with each heating element extending across the air passage and being supported at both sides of the air passage by the support ring. The serpentine heating elements are generally parallel to each other and evenly spaced in the air passage. A power supply supplies electrical current to the heating elements such that air passing through the air passage is heated by the heating elements. Three phase electrical current may be provided to the plurality of heating elements.

The serpentine heating elements are each supported in the air passage only at the sides of the air passage. A second support ring in the conduit, spaced along the conduit from the first support ring, supports the plurality of serpentine heating elements at the sides of the heating elements. The power supply includes a thermal sensor in the air passage adjacent the end of the heater from which the heated air exits, with the thermal sensor providing an indication of the temperature of the heated air. Each of the plurality of serpentine heating elements defines a plurality of parallel and alternating ridges and grooves on the upper and lower surfaces of the elements. The alternating ridges and grooves extend through the air passage in the direction of air flow. The power supply may include a resistance sensor for sensing the electrical resistance of one of the heater elements. In such an arrangement, the sensed resistance provides an indication of the temperature of the heating element. The heating elements may each be made of a high resistance material, laminated between non-conductive layers. This high resistance material may be a nickel chromium alloy.

A heater for heating air passing through a conduit to an aircraft cabin includes a support in the conduit, defining an air passage there through. A plurality of non-planar heating elements is provided, with each heating element extending across the air passage and supported by the support. The non-planar heating elements are generally evenly spaced in the air passage. A power supply supplies electrical current to the heating elements such that air passing through the air passage is heated by the heating elements. Each of the plurality of non-planar heating elements is supported in the air passage only by the support at the periphery of the air passage. The power supply includes a thermal sensor in the air passage adjacent the end of the heater from which the heated air exits. The thermal sensor provides an indication of the temperature of the heated air. The thermal sensor includes a bimetal element for controlling the application of power to the heating elements such that the air adjacent the thermal sensor is maintained within temperature limits. The power supply includes a resistance sensor for sensing the electrical resistance of one or more of the heater elements. The sensed resistance providing an indication of the temperature of the heating element. The heating elements are each made of a high resistance material laminated between non-conductive layers. The high resistance material is a nickel chromium alloy. Three phase electrical current may be provided to the plurality of heating elements.

The non-planar heating elements may each have a wavy shape across the air passage such that the non-planar heating elements are sufficiently robust and do not require support within the air passage. The heating elements may each define a plurality of ridges and valleys which alternate across the width of the element. The ridges and valleys run the length of the elements in the direction of air flow through the air passage.

A heater for heating air passing through a conduit to an aircraft cabin includes a support in the conduit, defining an air passage there through. A plurality of corrugated heating elements is provided. Each heating element extends across the air passage and is supported only by the support at the periphery of the air passage. The corrugated heating elements are generally evenly spaced in the air passage. A power supply provides electrical current to the heating elements such that air passing through the air passage is heated. Each of the plurality of corrugated heating elements defines a plurality of parallel and alternating ridges and grooves. The ridges and grooves extend generally in the direction of air flow through the air passage. The power supply includes a thermal sensor in the air passage adjacent the end of the heater from which the heated air exits. The thermal sensor provides an indication of the temperature of the heated air. The thermal sensor may include a bimetal element for controlling the application of power to the heating elements such that the air adjacent the thermal sensor is maintained within temperature limits. The power supply may include a resistance sensor for sensing the electrical resistance of one or more of the heater elements. The resistance provides an indication of the temperature of the heating element. The heating elements may be made of a high resistance material laminated between non-conductive layers, and the high resistance material may be a nickel chromium alloy. Three phase electrical current may be provided to the plurality of heating elements. Alternatively, the heating elements may be connected to single phase or two phase power sources. The non-planar heating elements are sufficiently robust so as not to require support within the air passage as a consequence of their non-planar shapes.

DETAILED DESCRIPTION OF THE PREFERRED EMBODIMENTS

Figure 1:
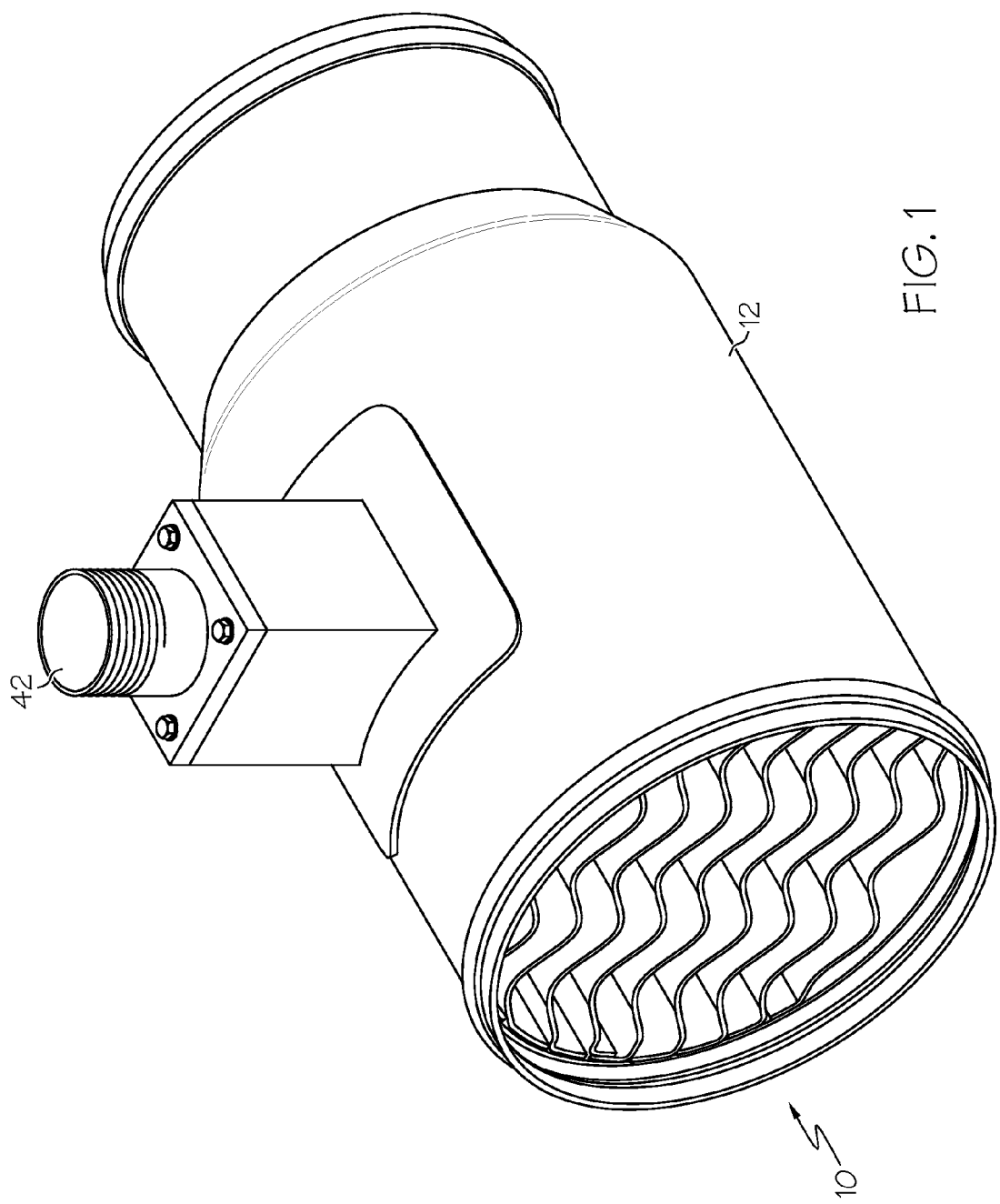
FIG. 1 is a perspective view showing an aircraft heater for heating air passing through a conduit.

FIG. 1 shows a heater 10 for heating air passing through a conduit 12 to an aircraft cabin. This air may come from outside the aircraft, from inside the aircraft, or from both. As seen more clearly in FIGS. 2-4, the heater includes first and second support rings 14 and 16. Each of the support rings 14 and 16 is generally annular in shape and defines an air passage there through. The rings 14 and 16 are each made of an electrically non-conductive material so that a plurality of serpentine heating elements 18, 20, 22, 24, 26, 28, 30, 32, and 34 can be supported by the support rings 14 and 16, with the heating elements being electrically isolated from each other and from other heater components. The heating elements are each made of a high electrical resistance material that is laminated between non-conductive layers. The high resistance material may be a nickel chromium alloy, such as for example Iconel high resistivity alloy. Each of the heating elements 18-34 extends across the air passage and is supported at both sides of the air passage by the support ring 14 and 16. The Iconel alloy lamination may be on the order of 0.001 inch thick, laminated between polyimide layers to produce heating elements having a thickness on the order of 0.035 inch. The heating elements are molded into the desired shape, and when receiving power may have a surface temperature in the range of 200° F. to 250° F.

Figure 2:
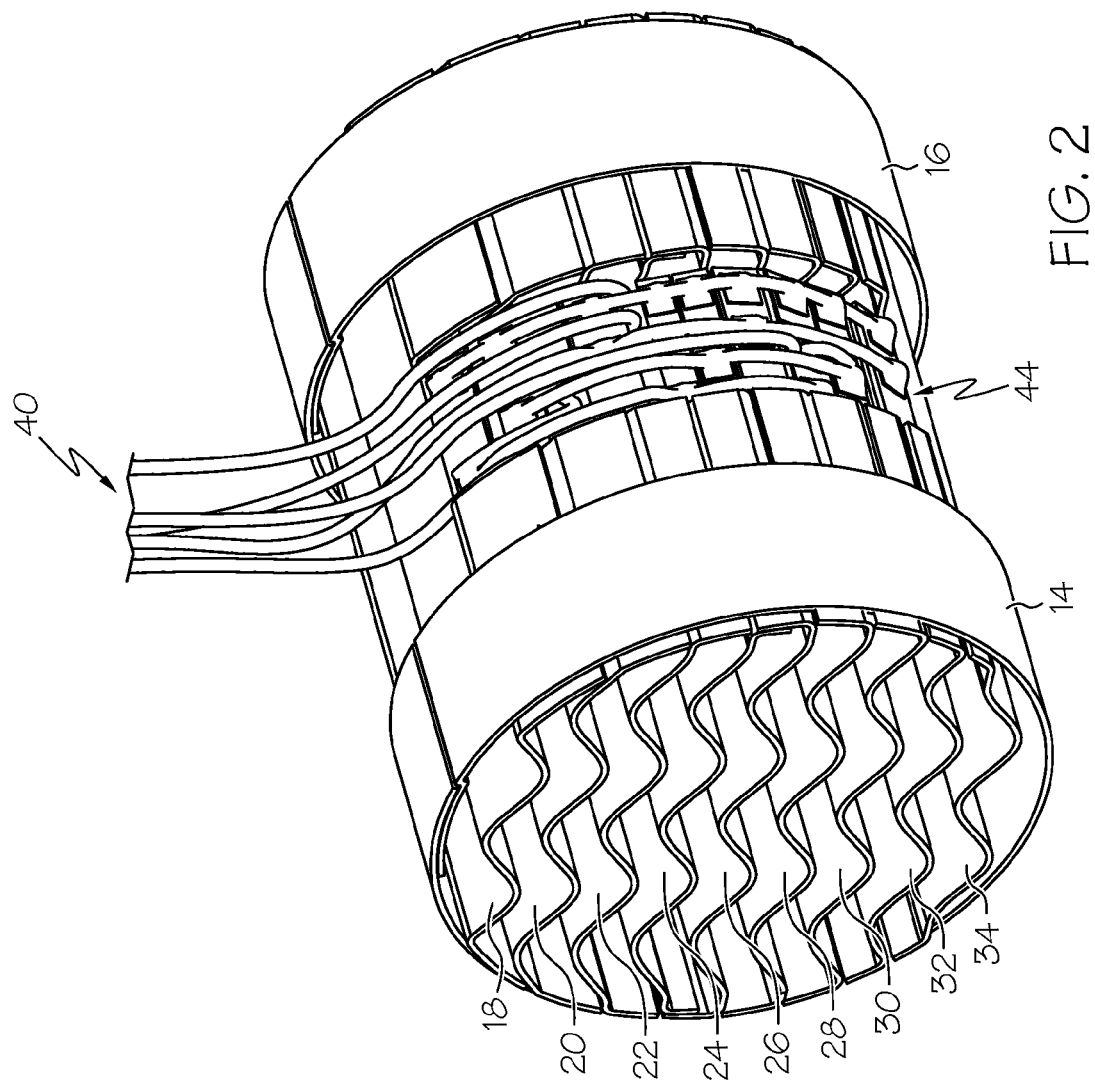
FIG. 2 is a perspective view of the heater of FIG. 1, removed from the conduit.
Figure 3:
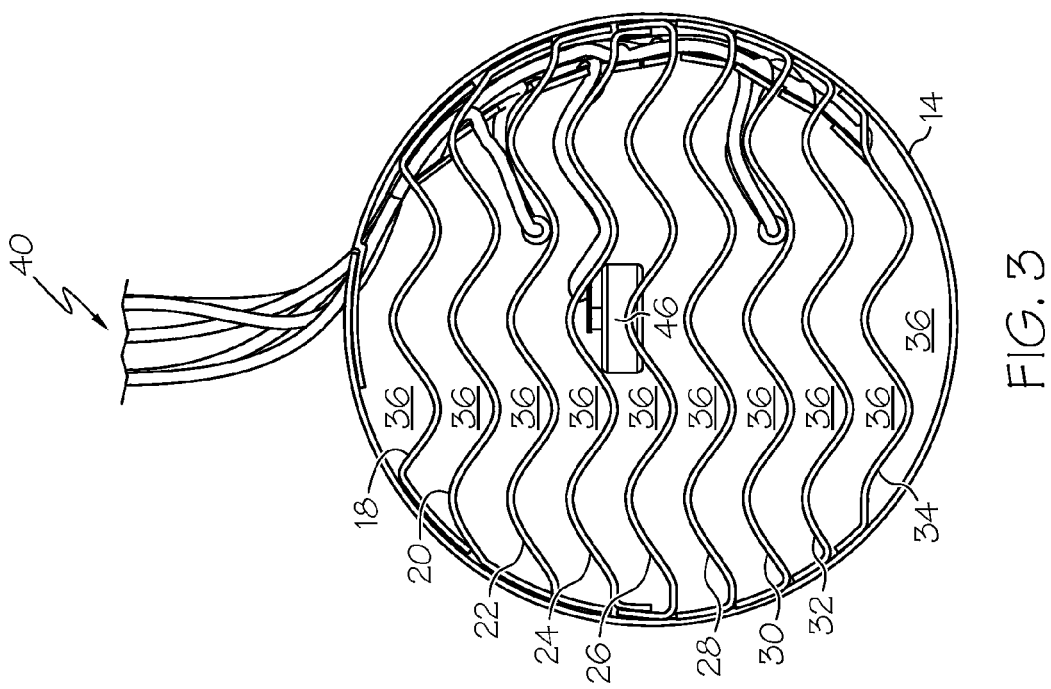
FIG. 3 is a view of the heater as seen looking generally from left to right in FIG. 1.

As best noted in FIGS. 2 and 3, the serpentine heating elements 18-34 are generally parallel to each other and evenly spaced in the air passage. The heating elements are non-planar and corrugated in shape, each defining a plurality of parallel and alternating ridges and grooves, with the ridges and grooves extending generally in the direction of air flow through the air passage. As will be noted, the heating elements 14-16 are not parallel in the sense that all portions of the surface of each heating element is parallel to all portions of the surface of all of the other heating elements. However, as perhaps best seen in FIG. 3, the serpentine shapes of the heating elements are aligned so that the spacing between the vertically stacked heating elements remains generally uniform, and the matching shapes of the non-planar, corrugated heating elements results in air passages 36 between plates that are fairly uniform. Note that since upper and lower air passages 36' are bounded by only single heating elements 18 and 34, respectively, the shapes of these air passages differ slightly from that of the others.

It will be appreciated that the heating elements 18-34 are supported only at their sides, and that there is no additional structural support required within the air passage to keep the relatively thin, vertically stacked heating elements in position. By using relatively thin heating elements with no additional structural support, the weight of the heater and the resistance to the flow of air through the heater are minimized. The non-planar, wavy, corrugated, and serpentine shape of the heating elements adds strength to the heating elements and permits the heating elements to be self-supporting across the air flow passage, even though they are relatively thin. It should be understood that throughout this description and the appended claims, spatial references to "side," "upper," "lower," and the like, are all intended as relative references and are not presented with respect any particular coordinate system.

Figure 5:
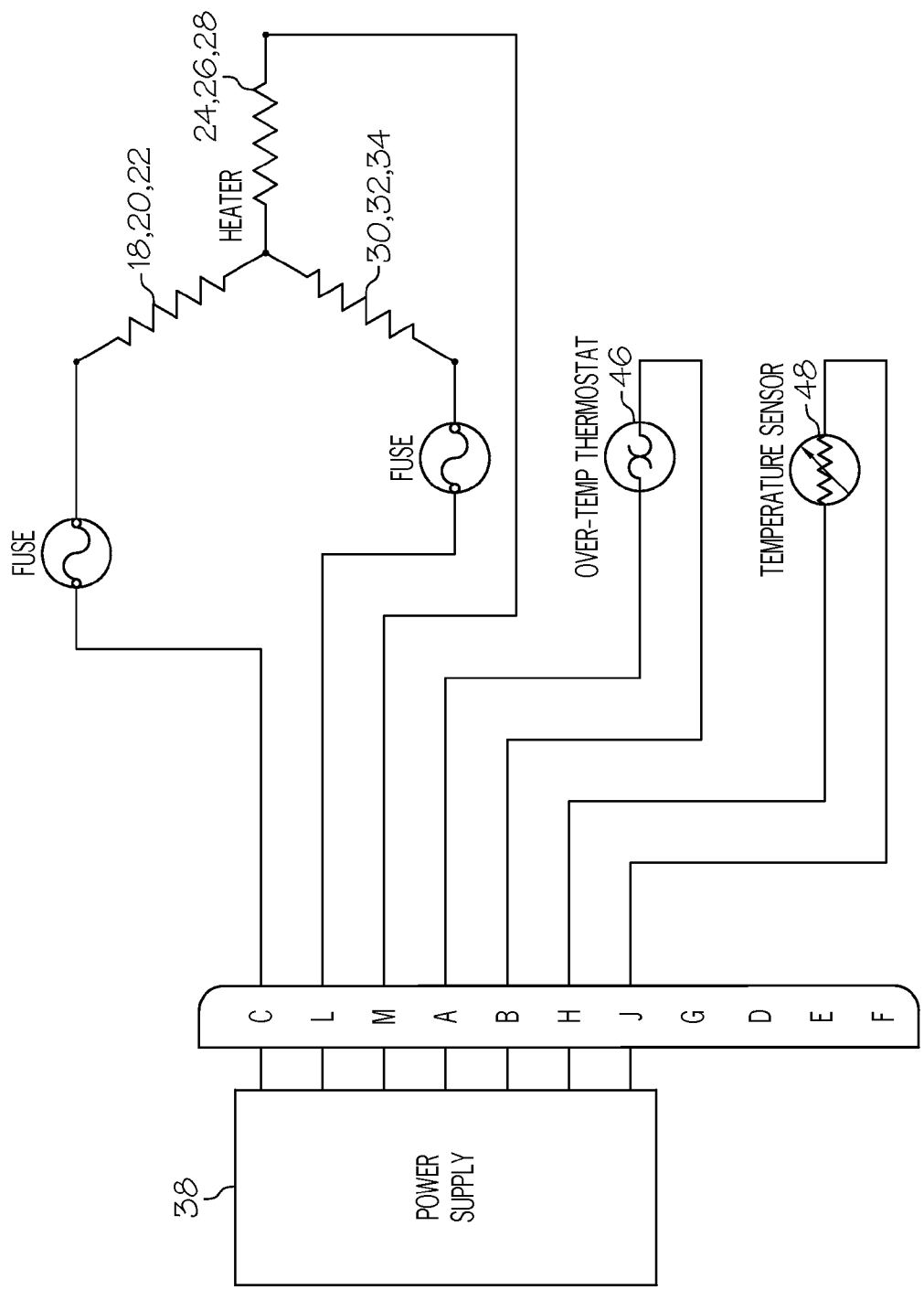
FIG. 5 is an electrical schematic of the heater.

The heater further includes a power supply 38 (FIG. 5) for supplying electrical current to the heating elements 18-34 such that air passing through the air passages 36 is heated by the heating elements. As illustrated in FIG. 5, three phase electrical current may be provided to the plurality of heating elements. In one example, heating elements 18, 20, and 22 may be connected in parallel, heating elements 24, 26, and 28 may be connected in parallel, and heating elements 30, 32, and 34 may be connected electrically in parallel. As shown in FIG. 5, these three parallel-connected heating element groups are connected in a Y configuration, and a three phase power source connected to the heater to effect heating of the air. It should be appreciated, however, that single phase or two phase power may also be used.

The plurality of serpentine heating elements 18-34 are each supported in the air passage only at the sides of the air passage. This has several significant advantages. For example, the elimination of an internal support structure enhances the flow the air, and significantly reduces the power needed to move air through the heater. Further, eliminating an internal support structure smoothes the flow of air passing through heater, and reduces the undesirable erratic switching of the airflow from laminar to turbulent to laminar.

Figure 4:
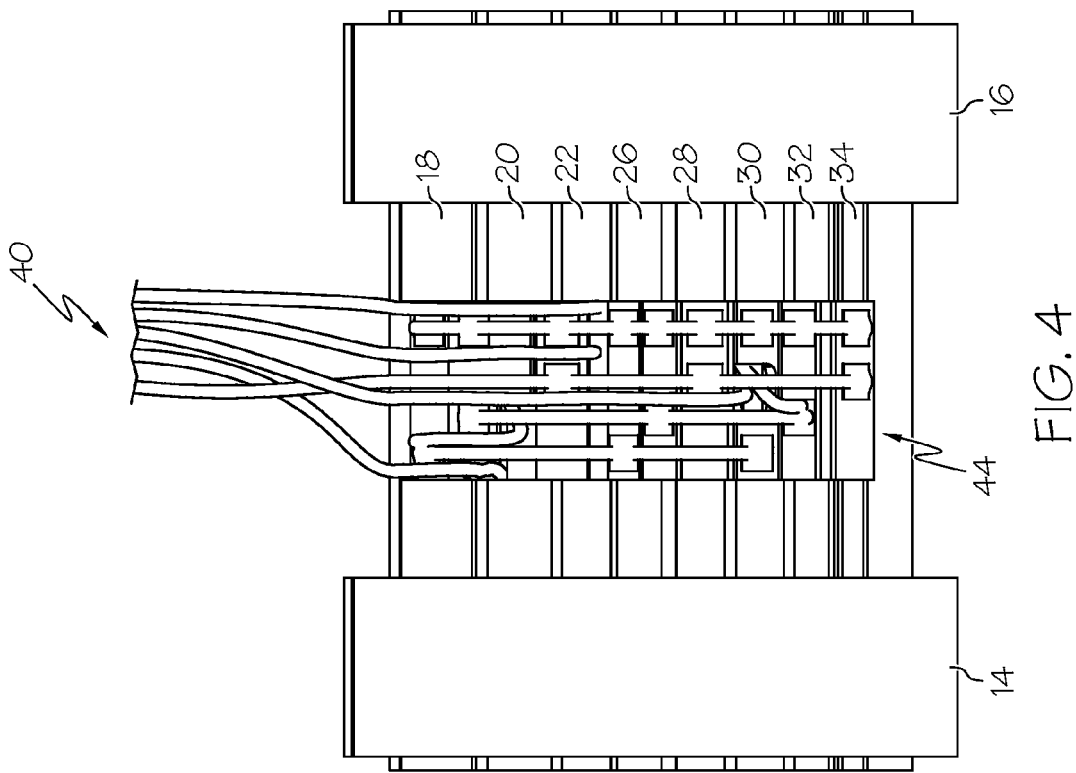
FIG. 4 is a side view of the heater, as seen looking from right to left in FIG. 3.

As best seen in FIGS. 2 and 4, the support for the heating elements is provided only by the first and second support rings 14 and 16. Support rings 14 and 16 may be made of an electrically non-conductive material which is capable of withstanding elevated temperatures for extended periods without deteriorating. Such rings may be formed of laminate structures of various polymer materials. Note that leads 40, which pass through conduit 42 (FIG. 1), extend along the side of the heating elements in a channel 44 to the various connection points on the heating elements. The heater includes a thermal sensor 46 in the air passage adjacent the end of the heater from which the heated air exits. The thermal sensor 46 is secured to one or more of the heating elements and provides an indication of the temperature of the heated air to the power supply 38. The sensor 46 may be a bimetal thermostat that simply cycles on and off between two fixed operating temperatures. The heater may also or may alternatively include a temperature sensor 48 which is positioned appropriately in the heater and which changes electrical resistance in dependence upon its temperature. As a further alternative thermal sensor arrangement, the heater may include one or more heating elements that vary in electrical resistance in a prescribed, predictable manner throughout the range of heater operating temperatures. With such an arrangement, the power to the heater can be periodically briefly turned off and a test voltage applied across the heating element to permit the electrical resistance of the heating element to be measured. A comparison of the measured resistance to a lookup table of resistance and temperature values may provide the power supply 30 with the temperature data necessary to adjust the heater power.

The heater 10 fits tightly into the conduit 12, and the mass of the structure is located at the periphery of the heater, in the lowest air velocity region of the duct, so that it does not affect air flow significantly. The interconnection lead area is located in the recess 44 between the surface of the conduit 12 and the heater elements. This location exposes the lead assembly to un-heated air, which improves the reliability of the connection area. The recess 44 also facilitates assembly of such heaters, as the leads can be visually aligned in an easily recognized pattern. As some three phase heaters may have twenty-four heating elements or more, this feature represents an improvement over the more previously configured forward-facing terminals arranged around the periphery of the conduit. When viewed from the direction of airflow (e.g., as seen in FIG. 3), the heater elements are arranged with a generally parallel, wavy shape. The shape may vary somewhat depending on conduit size and airflow. This non-planar shape causes the velocity of the air passing over the heating elements to self equalize, and maintains air velocity throughout the assembly. The improved airflow control allows the power density of the heater elements to be increased, which allows the overall length and weight of the unit to be reduced. The non-planar shape also makes the relatively thin elements robust enough to withstand significant vibration. The corrugated shape also better withstands high airflow rates without fluttering. It will be appreciated that flexing the heating elements could cause the elements to split and the heater to fail. The reduction in length and weight made possible by the increase in power density also strengthens the heater elements.

What is claimed is:

1. A heater for heating air passing through a conduit to an aircraft cabin, comprising:
    a first support ring in the conduit, defining an air passage there through,
    a plurality of serpentine heating elements, each heating element extending across said air passage and supported at both sides of said air passage by said support ring, said serpentine heating elements being congruent, generally parallel to each other and evenly spaced in said air passage, said heating elements being stacked to provide serpentine air passages therebetween of generally uniform dimension, and
    a power supply for supplying electrical current to said heating elements such that air passing through said air passage is heated by said heating elements.

2. The heater of claim 1, in which said plurality of serpentine heating elements are each supported in said air passage only at the sides of said air passage.

3. The heater of claim 1, further comprising a second support ring in the conduit, spaced along the conduit from said first support ring, said second support ring supporting said plurality of serpentine heating elements at the sides of said heating elements.

4. The heater of claim 1, in which said power supply includes a thermal sensor in said air passage adjacent the end of the heater from which the heated air exits, said thermal sensor providing an indication of the temperature of the heated air.

5. The heater of claim 4, in which each of said plurality of serpentine heating elements each define a plurality of parallel and alternating ridges and grooves on the upper and lower surfaces of the elements, said alternating ridges and grooves extending through said air passage in the direction of air flow.

6. The heater of claim 1, in which said power supply includes a resistance sensor for sensing the electrical resistance of one of said heater elements, the resistance providing an indication of the temperature of the heating element.

7. The heater of claim 1, in which said heating elements are each made of a high resistance material laminated between non-conductive layers.

8. The heater of claim 7, in which said high resistance material is a nickel chromium alloy.

9. The heater of claim 1, in which three phase electrical current is provided to said plurality of heating elements.

10. A heater for heating air passing through a conduit to an aircraft cabin, comprising:
    a support in the conduit, defining an air passage there through,
    a plurality of congruent, non-planar heating elements, each heating element extending across said air passage and supported by said support, said non-planar heating elements being stacked and generally evenly spaced in said air passage to provide serpentine air passages therebetween, and
    a power supply for supplying electrical current to said heating elements such that air passing through said air passage is heated by said heating elements.

11. The heater of claim 10, in which said plurality of non-planar heating elements are each supported in said air passage only by said support at the periphery of said air passage.

12. The heater of claim 10, in which said power supply includes a thermal sensor in said air passage adjacent the end of the heater from which the heated air exits, said thermal sensor providing an indication of the temperature of the heated air.

13. The heater of claim 12, in which said thermal sensor includes a bimetal element for controlling the application of power to said heating elements such that the air adjacent said thermal sensor is maintained within temperature limits.

14. The heater of claim 10, in which said power supply includes a resistance sensor for sensing the electrical resistance of one or more of said heater elements, the resistance providing an indication of the temperature of the heating element.

15. The heater of claim 10, in which said heating elements are each made of a high resistance material laminated between non-conductive layers.

16. The heater of claim 15, in which said high resistance material is a nickel chromium alloy.

17. The heater of claim 10, in which three phase electrical current is provided to said plurality of heating elements.

18. The heater of claim 10, in which said non-planar heating elements each have a wavy shape across said air passage such that said non-planar heating elements are sufficiently robust so as not to require support within said air passage.

19. The heater of claim 18, in which said heating elements each define a plurality of ridges and valleys which alternate across the width of the elements, said ridges and valleys running along the length of said elements in the direction of air flow through said air passage.

20. A heater for heating air passing through a conduit to an aircraft cabin, comprising:
a support in the conduit, defining an air passage there through,
a plurality of congruent, corrugated heating elements, each heating element extending across said air passage and supported only by said support at the periphery of said air passage, said corrugated heating elements being generally stacked and evenly spaced in said air passage to provide serpentine air passages therebetween, and
a power supply for supplying electrical current to said heating elements such that air passing through said air passage is heated by said heating elements.

21. The heater of claim 20, in which said plurality of corrugated heating elements each defines a plurality of parallel and alternating ridges and grooves, said ridges and grooves extending generally in the direction of air flow through said air passage.

22. The heater of claim 20, in which said power supply includes a thermal sensor in said air passage adjacent the end of the heater from which the heated air exits, said thermal sensor providing an indication of the temperature of the heated air.

23. The heater of claim 22, in which said thermal sensor includes a bimetal element for controlling the application of power to said heating elements such that the air adjacent said thermal sensor is maintained within temperature limits.

24. The heater of claim 20, in which said power supply includes a resistance sensor for sensing the electrical resistance of one or more of said heater elements, the resistance providing an indication of the temperature of the heating element.

25. The heater of claim 20, in which said heating elements are each made of a high resistance material laminated between non-conductive layers.

26. The heater of claim 25, in which said high resistance material is a nickel chromium alloy.

27. The heater of claim 20, in which three phase electrical current is provided to said plurality of heating elements.

28. The heater of claim 20, in which said non-planar heating elements each have a wavy shape across said air passage such that said non-planar heating elements are sufficiently robust so as not to require support within said air passage.

* * * * *